PHONOGRAPH RECORD ADAPTER
Filed Feb. 24, 1950 2 Sheets-Sheet 1
FIG. 1.
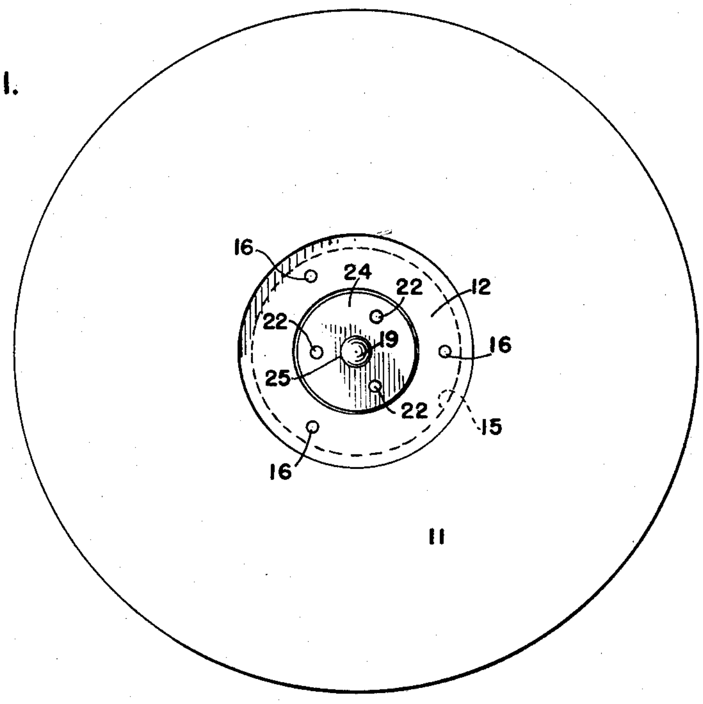
FIG. 2.
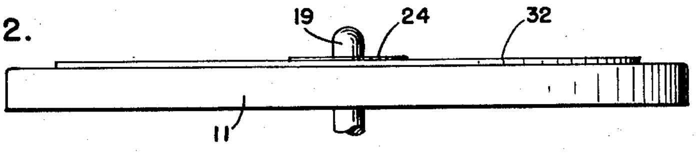
FIG. 3.
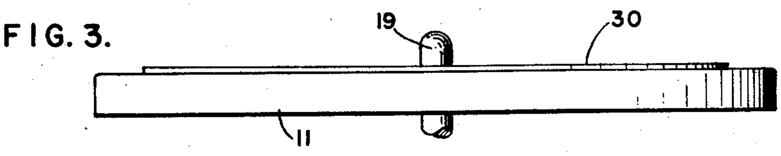
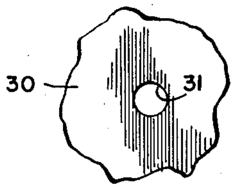
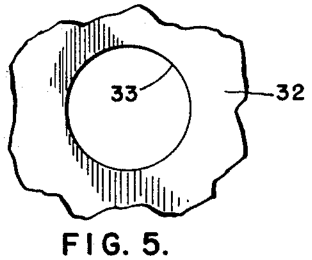
FIG. 4. FIG. 5.
INVENTOR
NORMAN L. CHALFIN,
BY Irving Seidman
ATTORNEY Nov. 2, 1954 N. L. CHALFIN 2,693,364

PHONOGRAPH RECORD ADAPTER

Filed Feb. 24, 1950 2 Sheets-Sheet 2

INVENTOR
NORMAN L. CHALFIN,
BY Irving Seidman
ATTORNEY 2,693,364
Patented Nov. 2, 1954

2,693,364

PHONOGRAPH RECORD ADAPTER

Norman L. Chalfin, New York, N. Y., assignor of thirty per cent to Irving Seidman, New York, N. Y.

Application February 24, 1950, Serial No. 146,078

3 Claims. (Cl. 274—39)

This invention relates to an attachment for phonograph turntables and has particular reference to an adapter which is movably attached upon the turntable to supply a means for readily placing and centering sound recording disks having differently sized centering orifices.

Sound recording disks have heretofore been manufactured having a small centering orifice which engaged over a spindle provided upon the phonograph proper and extended upwardly through the turntable. New sound recording disks with considerably larger centering orifices are now being manufactured and placed upon the market requiring additional mechanical means to receive the said larger orificed sound disks and hold them, properly centered, upon the turntable and which without the said mechanical means, are unusable upon present day phonographs.

It is the object of this invention to provide an attachment, in the form of an adapter, having a movably mounted centering means which will accommodate the larger orificed sound recording disks and at the same time retaining the regulation spindle centering means to accommodate the standard small orificed sound recording disks.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 1 is a top or plan view of a phonograph turntable showing an adapter thereon.

Fig. 2 is an elevational view showing the new type sound recording disk which is made with the larger centering orifice, in place upon the turntable.

Fig. 3 is a similar elevational view of a turntable showing an old type sound recording disk having the regulation small centering orifice formed thereon in place upon the turntable.

Fig. 4 is a fragmentary plan of a sound recording disk of the old regulation type formed with a small orifice.

Fig. 5 is a similar view showing part of the new type sound recording disk formed with the larger centering orifice.

Figure 6:
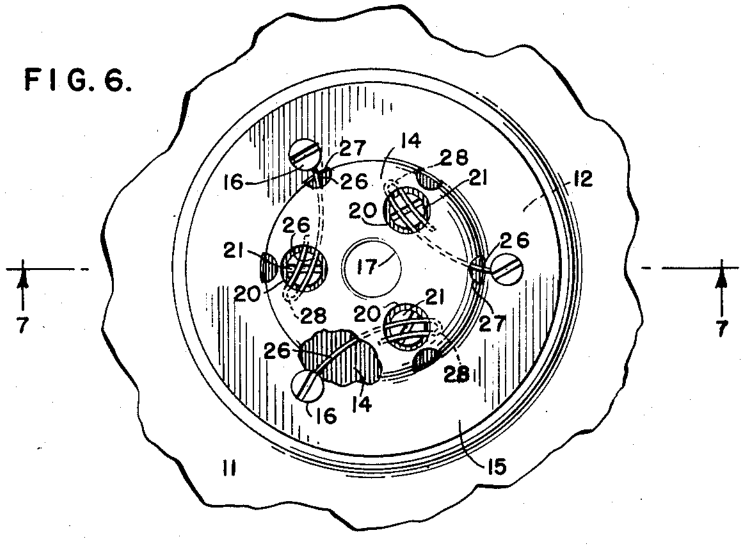
Fig. 6 is an enlarged fragmentary bottom view of the central portion of a turntable.

Referring in detail to the parts, 11 designates a phonograph turntable which is formed with a centrally located annular depression forming a pocket 12 and having a concentrically placed orifice 13. Attached to the underside of the said turntable 11 is a cupped housing or cage 14 formed with an annular flange 15 through which screws 16 engage to secure the said cupped housing 14 to the underside of the said turntable 11. An orifice 17, having a turned in rim 18 is formed in the bottom of said housing 14 and is aligned with the orifice 13 formed in the said depressed portion 12. The said orifices 13 and 17 are adapted to engage over a spindle 19 forming a part of a regulation phonograph (not shown) and acts as a support and rotation shaft for the said turntable and as a centering pin for sound recording disks of the familiar 78 r. p. m. and 33⅓ r. p. m. variety having centering holes approximately 9/32 of an inch in diameter.

The said housing 14 is formed with apertures 20 (Fig. 6) which provide access openings to screw heads 21 formed upon the lower ends of pins 22 which slidably engage through the bottom of the said depressed portion 12. The said pins 22 are formed with threaded upper ends 23 which engage within threaded openings in an annular plate or disk 24. An orifice 25 is formed in the said annular plate 24 and is aligned with the aforesaid orifices 13 in the turntable and 17 in the cupped housing. It will be noted that the said annular plate 24 with its attached pins may have vertical movement, limited by the distance between the said annular plate 24 and the said screw heads 21. The said annular plate 24, however, is urged to a normally raised position (Fig. 7) by hair springs 26 which are secured, at their outer ends, under the heads of the said screws 16. Openings 27 are provided in the annular wall of the said housing 14 through which the said springs 26 engage and press upwardly, at their inner ends 28, against the heads 21 of said pins 22.

Figure 7:
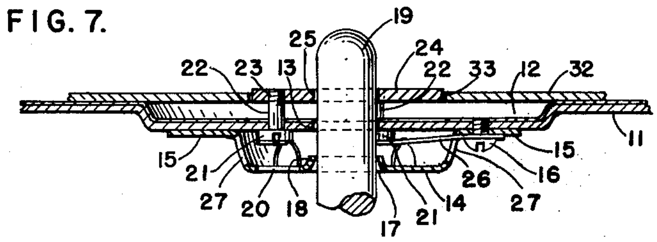
Fig. 7 is a sectional elevational view taken on a plane along the line 7—7 of Fig. 6 and shows a fragment of a large orificed sound recording disk in position and centered upon the turntable.
Figure 8:
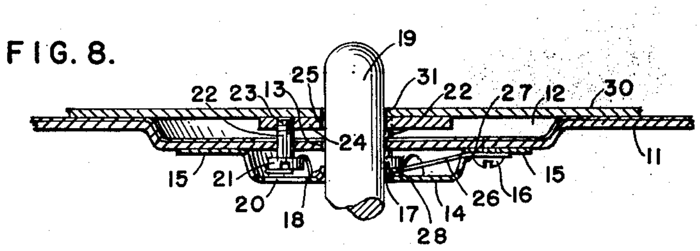
Fig. 8 is a similar sectional view but shows the smaller orificed sound recording disk in place upon the turntable.
Figure 9:
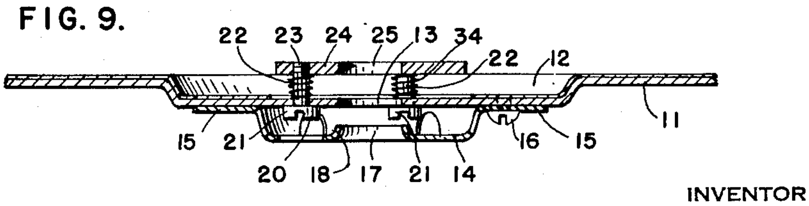
Fig. 9 is a similar sectional view showing a slight modification but does not show a sound recording disk upon the turntable.

As shown in Fig. 8, an old type disk 30, having the regulation small centering orifice 31, is in place upon the turntable 11, and the weight of said disk is sufficient to depress the said annular plate 24 downwardly against the pressure of the springs 26 and allow the said disk 30 to rest upon the upper surface of the said turntable. Upon removal of the said disk 30 the said annular plate will move upwardly and assume its uppermost position as shown in Figs. 7 and 9.

When a new type sound recording disk 32, having an enlarged centering orifice 33, is placed upon the said turntable, it will embrace the said raised annular plate 24, which will act as a centering means for the said sound recording disk 32. A form of disk such as disk 32 is the ring shaped 45 r. p. m. record now being manufactured, and having a centering hole as shown at 33 (Fig. 5) with a diameter of 1½ inches.

The springs 26 may be substituted by spiral springs 34 (Fig. 9) which engage around the pins 22 and are disposed between the said annular plate 24 and the floor of the depressed portion 12. A leaf spring or other form of spring may be substituted.

I claim:

1. In a phonograph record player turntable concentrically mounted on a spindle shaft for rotation thereon, said turntable having a central portion recessed below the top surface of the turntable, said spindle shaft protruding above the surface of the turntable, said recessed portion having a plurality of uniformly spaced holes, a centering device for a first type of phonograph record, said first type of record having a center hole substantially larger in diameter than the diameter of the spindleshaft, said centering device comprising an annular disk having an outer diameter substantially the same as the diameter of said center hole of said record of said first type, said annular disk having a center hole for freely clearing said spindleshaft; a plurality of headed pins uniformly spaced and secured to the underside of said annular disk; said headed pins protruding through said holes in said central recessed portion of said turntable to permit vertical motion of said disk, the heads of said headed pins limiting the upward vertical motion to a first position of said disk above the top surface of said turntable for centering a record of said first type; and resilient means attached to the underside of said turntable recess and to said headed pins for urging said disc upward into said first position, said disk being movable vertically downward against the urge of said resilient means to a second position into said turntable recess when records of a second type are placed on said turntable, said records of said second type having a centering hole of substantially the same diameter as said spindle shaft, said disk being hold in said recess by the weight of said record of said second type.

2. The combination with a phonograph record player turntable rotatable on a spindle shaft for centering sound record disks with centering holes approximately 9/32 inch in diameter, said turntable having an annular central depression in its surface concentric with said spindle of a centering means for record disks with centering holes approximately 1½ inches in diameter, said centering means being resiliently mounted over said central depression, said means having a first position as a result of the urge of said resilient mounting, said first position being above the surface of said turntable, for centering said disks with 1½ inch centering holes, said centering means being vertically movable from said first position to a second position against said resilient mounting into said central depression by the weight of records having 9/32 inch diameter centering holes, when said records with said 9/32 inch diameter centering holes are placed on the turntable.

3. Means for centering 45 R. P. M. records on a phonograph record player turntable, said record player turntable having a spindle approximately 9/32″ in diameter and a central depressed portion concentric with said spindle, said 45 R. P. M. records having a center hole approximately 1½ inches in diameter, said means having an annular shape and being adapted for resilient mounting to said turntable over said depressed portion, said spindle protruding through said means and said turntable top, said means rotating by said resilient mounting with said turntable and being held by said resilient mounting and urged to a first position above the surface of said turntable for centering said 45 R. P. M. records, said means being forced into a second position in said depressed portion when records having 9/32 inch diameter center holes are placed upon said turntable in place of said 45 R. P. M. records.

References Cited in the file of this patent

UNITED STATES PATENTS

| Number | Name | Date |
|---|---|---|
| 874,985 | O'Neill | Dec. 31, 1907 |
| 1,440,276 | Cerveny | Dec. 26, 1922 |
| 2,286,015 | Schneider | June 9, 1942 |
| 2,416,583 | Hartley et al. | Feb. 25, 1947 |
| 2,554,919 | Mullaney | May 29, 1951 |
| 2,577,035 | Reid | Dec. 4, 1951 |

FOREIGN PATENTS

| Number | Country | Date |
|---|---|---|
| 355,621 | Great Britain | Aug. 27, 1931 |